US008243211B2

(12) United States Patent
Bazzani et al.

(10) Patent No.: US 8,243,211 B2

(45) Date of Patent: Aug. 14, 2012

(54) REDUCING POWER DISSIPATION IN PORTABLE LCOS/LCD/DLP PROJECTION SYSTEMS

(75) Inventors: Cristiano Bazzani, Irvine, CA (US); Daniel Draper, Portland, OR (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 655 days.

(21) Appl. No.: 12/384,035

(22) Filed: Mar. 30, 2009

(65) Prior Publication Data

US 2009/0256973 A1 Oct. 15, 2009

Related U.S. Application Data

(60) Provisional application No. 61/072,446, filed on Mar. 31, 2008, provisional application No. 61/190,978, filed on Sep. 3, 2008.

(51) Int. Cl.
*H04N 5/64* (2006.01)

(52) U.S. Cl. .......................... 348/744; 348/554; 353/85

(58) Field of Classification Search .................. 348/554; 353/85

See application file for complete search history.

(56) References Cited

U.S. PATENT DOCUMENTS

| | | | |
|---|---|---|---|
| 4,534,064 | A | 8/1985 | Giacometti et al. |
| 4,545,078 | A | 10/1985 | Wiedeburg |
| 4,687,924 | A | 8/1987 | Galvin et al. |
| 4,734,914 | A | 3/1988 | Yoshikawa |
| 4,747,091 | A | 5/1988 | Doi |
| 4,864,649 | A | 9/1989 | Tajima et al. |
| 5,019,769 | A | 5/1991 | Levinson |
| 5,039,194 | A | 8/1991 | Block et al. |
| 5,047,835 | A | 9/1991 | Chang |
| 5,057,932 | A | 10/1991 | Lang |
| 5,334,826 | A | 8/1994 | Sato et al. |
| 5,383,046 | A | 1/1995 | Tomofuji et al. |
| 5,383,208 | A | 1/1995 | Queniat et al. |
| 5,392,273 | A | 2/1995 | Masaki et al. |

(Continued)

FOREIGN PATENT DOCUMENTS

EP 1471671 12/2004

(Continued)

OTHER PUBLICATIONS

Jamie Bailey "How DVD Works", http://sweb.uky.edu/~jrbai101/dvd.htm, May 1, 1999, pages.

(Continued)

*Primary Examiner* — Jefferey Harold
*Assistant Examiner* — Sam Huang
(74) *Attorney, Agent, or Firm* — Weide & Miller, Ltd.

(57) ABSTRACT

A projection system with one or more light sources reduced power consumption and optional scanning capability is disclosed. A controller processes image data to generate light source control signals and pixel screen control signals which are coordinated to generate an image. Reductions in power consumption occur by matching the light output from the light source to the brightest pixel(s) in the pixel screen for a particular frame. By setting the light output level to an intensity or duration matched to only the maximum level corresponding to a image frame, power consumption is reduced as compared to an embodiment which sets the light source output to its maximum level or maximum duration. The pixel screen, which may be an LCD screen, sets pixel areas corresponding to the brightest pixels as transparent and other, less bring pixels on the pixel screen are set to appropriate levels of reduced transparency.

22 Claims, 10 Drawing Sheets

U.S. PATENT DOCUMENTS 5,394,416 A 2/1995 Ries
5,396,059 A 3/1995 Yeates
5,448,629 A * 9/1995 Bosch et al. .................. 398/191
5,488,627 A 1/1996 Hardin et al.
5,510,924 A 4/1996 Terui et al.
5,557,437 A 9/1996 Sakai et al.
5,574,435 A 11/1996 Mochizuki et al.
5,594,748 A 1/1997 Jabr
5,636,254 A 6/1997 Hase et al.
5,673,282 A 9/1997 Wurst
5,812,572 A 9/1998 King et al.
5,822,099 A 10/1998 Takamatsu
5,844,928 A 12/1998 Shastri et al.
5,900,959 A 5/1999 Noda et al.
5,926,303 A 7/1999 Giebel et al.
5,943,152 A 8/1999 Mizrahi et al.
5,953,690 A 9/1999 Lemon et al.
5,956,168 A 9/1999 Levinson et al.
5,978,393 A 11/1999 Feldman et al.
6,010,538 A 1/2000 Sun et al.
6,014,241 A 1/2000 Winter et al.
6,020,593 A 2/2000 Chow et al.
6,021,947 A 2/2000 Swartz
6,023,147 A 2/2000 Cargin, Jr. et al.
6,049,413 A 4/2000 Taylor et al.
6,064,501 A 5/2000 Roberts et al.
6,108,113 A 8/2000 Fee
6,111,687 A 8/2000 Tammela
6,115,113 A 9/2000 Flockencier
H1881 H 10/2000 Davis et al.
6,160,647 A 12/2000 Gilliland et al.
6,175,434 B1 1/2001 Feng
6,259,293 B1 7/2001 Hayase et al.
6,262,781 B1 * 7/2001 Deter ............................ 348/744
6,282,017 B1 8/2001 Kinoshita
6,292,497 B1 9/2001 Nakano
6,366,373 B1 4/2002 MacKinnon et al.
6,423,963 B1 7/2002 Wu
6,452,719 B2 9/2002 Kinoshita
6,473,224 B2 10/2002 Dugan et al.
6,494,370 B1 12/2002 Sanchez
6,512,617 B1 1/2003 Tanji et al.
6,535,187 B1 * 3/2003 Wood .............................. 345/84
6,556,601 B2 4/2003 Nagata
6,570,944 B2 5/2003 Best et al.
6,580,328 B2 6/2003 Tan et al.
6,661,940 B2 12/2003 Kim
6,704,008 B2 * 3/2004 Naito et al. ................... 345/207
6,707,600 B1 3/2004 Dijaili et al.
6,740,864 B1 5/2004 Dries
6,801,555 B1 10/2004 DiJaili et al.
6,836,493 B2 12/2004 Mahowald et al.
6,837,625 B2 1/2005 Schott et al.
6,852,966 B1 2/2005 Douma et al.
6,862,047 B2 * 3/2005 Hibi .............................. 348/743
6,868,104 B2 3/2005 Stewart et al.
6,888,123 B2 5/2005 Douma et al.
6,909,731 B2 6/2005 Lu
6,934,307 B2 8/2005 DeCusatis et al.
6,934,479 B2 8/2005 Sakamoto et al.
6,941,077 B2 9/2005 Aronson et al.
6,952,531 B2 10/2005 Aronson et al.
6,956,643 B2 10/2005 Farr et al.
6,957,021 B2 10/2005 Aronson et al.
6,967,320 B2 11/2005 Chieng et al.
7,031,574 B2 4/2006 Huang et al.
7,039,082 B2 5/2006 Stewart et al.
7,046,721 B2 5/2006 Grohn
7,049,759 B2 5/2006 Roach
7,050,720 B2 5/2006 Aronson et al.
7,058,310 B2 6/2006 Aronson et al.
7,066,746 B1 6/2006 Togami et al.
7,079,775 B2 7/2006 Aronson et al.
7,184,671 B2 2/2007 Wang
7,193,957 B2 3/2007 Masui et al.
7,206,023 B2 * 4/2007 Belliveau ...................... 348/370
7,215,891 B1 5/2007 Chiang et al.
7,265,334 B2 9/2007 Draper et al.
7,276,682 B2 10/2007 Draper et al.
7,357,513 B2 * 4/2008 Watson et al. .................. 353/31
7,381,935 B2 6/2008 Sada et al.
7,453,475 B2 * 11/2008 Nitta et al. .................... 345/690
7,504,610 B2 * 3/2009 Draper .......................... 250/205
2001/0046243 A1 11/2001 Schie
2002/0015305 A1 2/2002 Bornhorst et al.
2002/0105982 A1 8/2002 Chin et al.
2002/0130977 A1 * 9/2002 Hibi .............................. 348/744
2003/0030756 A1 * 2/2003 Kane et al. .................... 348/744
2003/0053003 A1 * 3/2003 Nishi et al. .................... 348/744
2004/0032890 A1 2/2004 Murata
2004/0047635 A1 3/2004 Aronson et al.
2004/0136727 A1 7/2004 Androni et al.
2004/0202215 A1 10/2004 Fairgrieve
2005/0180280 A1 8/2005 Hoshino et al.
2005/0185149 A1 * 8/2005 Lurkens et al. ................. 353/85
2005/0215090 A1 9/2005 Harwood
2006/0192899 A1 * 8/2006 Ogita ............................ 348/744
2007/0058089 A1 * 3/2007 Wang ............................ 348/744
2007/0081130 A1 4/2007 May et al.
2007/0195208 A1 * 8/2007 Miyazawa et al. ............ 348/744
2007/0229718 A1 * 10/2007 Hall, Jr. ........................ 348/744
2007/0286609 A1 * 12/2007 Ikram et al. ................... 398/197
2008/0024469 A1 * 1/2008 Damera-Venkata et al. . 345/204
2008/0074562 A1 * 3/2008 Endo et al. .................... 348/758
2008/0246893 A1 * 10/2008 Boss et al. .................... 348/744

FOREIGN PATENT DOCUMENTS

JP 2004045989 2/2004
WO WO 93/21706 10/1993
WO WO 02/063800 8/2002
WO WO 2004/098100 11/2004

OTHER PUBLICATIONS

Tuan “Solace” Nguyen, “CD, CD-R, CD-RW, DVD, DD-RAM, DVD-RW, and MO”, Tweak3D.Net-Your Freakin' Tweakin Source!, http://www.tweak3d.net/articles/opticals/, May 13, 2000, 7 pages.
Richard Wilkinson “Topic: Selecting the Right DVD Mastering Technique”, DVD Technology Update, http://www.optical-disc.com/dvdupdate.html, 2002, 8 pages.
Dr. John Rilum, “Mastering Beyond DVD Density”, http://www.optical-disc.com/beyonddvd.html, 2002, 7 pages.
“CD Basics: The Bumps”, Howstuffworks “How CD Burners Work”, http://entertainment.howstuffworks.com/cd-burnerl.htm, 2004, 3 pages.
“An Introduction to DVD Recordable (DVD-R) What is DVD Recordable?” http://www.dvd-copy.com/reference/dvd_recordable.html, 2004, 8 pages.
“An Introduction to DVD-RW”, DVD White Paper, Pioneer New Media Technologies, Inc., Feb. 8, 2001, 8 pages.

* cited by examiner

Previous solution
Frame time

Amplitude Modulation
Frame time

Pulse Width Modulation
Frame time

Duty cycle Modulation
Frame time

Power Level Mapping

| POWER_LEVEL_0 | PULSE_WIDTH_0 | POWER_TARGET_0 | GAIN_SET_0 |
| --- | --- | --- | --- |
| POWER_LEVEL_1 | PULSE_WIDTH_1 | POWER_TARGET_1 | GAIN_SET_1 |
| ⋮ | ⋮ | ⋮ | ⋮ |
| POWER_LEVEL_n | PULSE_WIDTH_n | POWER_TARGET_n | GAIN_SET_n |

Fig. 8

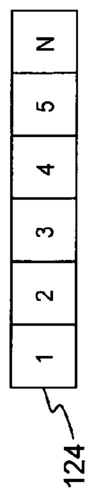
Fig. 9B
Fig. 9A
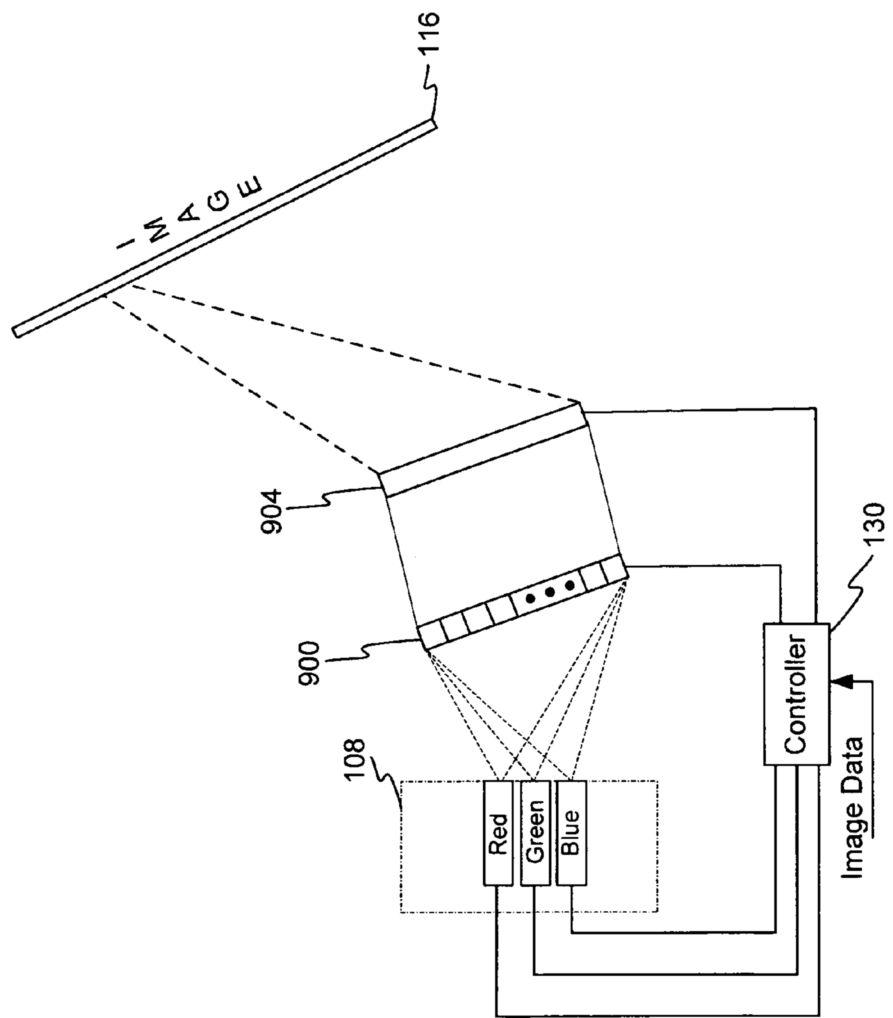

REDUCING POWER DISSIPATION IN PORTABLE LCOS/LCD/DLP PROJECTION SYSTEMS

PRIORITY CLAIMS

The application claims priority to and the benefit of U.S. Provisional Patent Application 61/072,446 filed Mar. 31, 2008 entitled Reducing Power Dissipation in Portable Projection Systems and U.S. Provisional Patent Application 61/190,978 filed Sep. 3, 2008 entitled Reducing Power Dissipation in Portable Projection Systems with Scanning Apparatus.

FIELD OF THE INVENTION

The invention relates to projector systems and in particular to a method and apparatus for reducing power consumption of projector systems.

RELATED ART

Projection based display systems are a popular and widely used method to project an image upon a large screen for viewing by one or more people. Projection systems have numerous advantages over enclosed systems including larger image size in relation to the size of the projection system, portability, and cost. However, current projection systems are capable of improvement. One such improvement may be in the form of reduced power consumption.

In a scanning projector system the image is generated by means of activation on a pixel by pixel basis of a red, green and blue light source beam that are then scanned across the projected image by mean of a MEMS mirror/mirrors.

In other projection systems, such as in a LCD/LCoS portable projector systems, the light is provided by 3 sources: a red, green and blue light source (laser, LED, or any other light source). Sometimes the light source is a single LED and the different colors are obtained through a color wheel or similar methodology. The image is created by activating these light sources to full power and then shining the resulting light onto and through an LCD/LCoS screen or DLP engine. The LCD/LCoS is configured as matrix of pixels where each one can be made transparent, opaque, or some level of opaqueness to light. The projected image is created by (selectively for each pixel) controlling the amount of light from the light sources which passes through the LCD/LCoS to thereby create the image.

A drawback of prior art projection systems is that over time or at different temperatures, the projection system may evidence inconsistent intensity of the various light sources due to different rate of aging of the light sources or different temperature of the same which will impact white balance behavior, color fidelity and image quality. Current prior art systems may adopt an open loop or a look-up table approach to deal with these inconsistencies.

The open loop method is commonly used today. In an open loop configuration there is no feedback mechanism for the light source control. The drawback of this approach is that the white balance and contrast are adjusted for a particular temperature when the system is assembled in the factory. However, as the temperature changes, given the probable different behavior of the light sources across temperature, the white balance and contrast deviates from the optimal value which in turn degrades image quality. Also light source aging will occur and might be different for the 3 different light sources and this will have similar unwanted impact on image quality.

In these systems generally a set of fans, heatsinks and/or TE coolers are employed to try to maintain operating temperature constant and minimize these effects, however start-up (cold) condition might require a warm-up time and TE-coolers and fans consume additional power. These two aspects and the lessening picture quality does not make this solution appealing.

Another option is to create and utilize a look-up table. In the look-up table approach, a temperature sensor is present in the system and a look-up table for each of the light sources is stored on an EEPROM in the system. A logic or microcontroller reads the temperature and programs the proper current in the light source driver for the desired light source optical power. It should be noticed that in today's systems the light sources are on at full power so a set of look-up tables is required for every light source. If multiple power levels are employed for the light source, as proposed below as part of this innovation, multiple look-up table would be required and the required amount of EEPROM would grow proportionally to the desired light source power level. The main drawback of this approach is the fact that light sources characteristic change significantly from vendor to vendor and even from light source to light source provided by the same vendor especially when light sources come from different batches. This puts a huge burden on the production because a look-up table needs to be built for every light source and for different temperatures. This is extremely time consuming and expensive (both from a cost of equipment and production test time standpoint).

The following disclosure provides a method and apparatus for generating a projection image while reducing power consumption and maintaining picture quality over time and temperature.

SUMMARY

To overcome the drawbacks of the prior art and to provide additional benefit a projection system and method of operation is disclosed which reduces power consumption. In one embodiment and as disclosed herein, a method is provided for generating a projected image where the image comprises multiple image pixels and for each color the method comprises receiving and processing image data to create pixel matrix control data and light source control data. Also part of this method is the step of providing the light source control data to one or more light sources to selectively control output intensity of the light source on a frame by frame basis. Then providing the pixel matrix control data to one or more pixel matrixes to selectively control the opaqueness of the pixels of the one or more pixel matrixes on a frame by frame basis. As part of this method, for a particular frame, the output intensity of one of the one or more light sources is set at a level by means of amplitude, pulse width modulation, or both. This in turn will yield a desired color intensity for the image pixel with the highest color intensity and a corresponding pixel in the pixel matrix is set to not reduce the light intensity passing there-through.

In one embodiment, the pixel matrix comprise a LCD/LCoS/DLP screen or other mean of filtering the light on a pixel by pixel basis. It is contemplated that the pixel matrix may comprise fewer pixels than the image. In addition, the at least one pixel in the pixel matrix is controlled to be transparent. In this method, light sources output light energy from the one or more light sources to generate an image.

Also disclosed herein is a method for controlling one or more light sources and one or more pixel screens to generate an image frame comprising receiving image data and processing the image data. The image data represents an image to be projected and within the image frame one or more pixels have a highest light intensity for the image frame. For the image frame, the method processes the image data to determine which one or more pixels in the image frame have the highest light intensity. Likewise, the method generates one or more pixel screen control signals to set translucency levels for the one or more pixels in the pixel screen. In this configuration the one or more pixels having the greatest light intensity are set to translucent. The method then determines an optic signal power level required to generate the highest light intensity for the image frame and generates one or more light source control signals based on the optic signal power level required to generate the highest light intensity. Thereafter, the method outputs the one or more pixel screen control signals to the pixel screen, and outputs the one or more light source control signals to the one or more light sources.

In one embodiment, the one or more light sources comprise one or more is lasers. In addition, the one or more pixel screens may comprise one or more LCD screens having individually controllable pixel areas capable of being controlled between a generally transparent state to a generally opaque state. It is contemplated that the one or more pixel screen control signals control pixels the pixel screen corresponding to pixels in the image frame having less than the highest light intensity to a corresponding level of translucency to pass an appropriate amount of light. For example, the one or more light sources output light having an intensity corresponding to the maximum light intensity for the image frame. This occurs based on the one or more light source control signals which determine the intensity of light generated by the one or more light sources.

Also disclosed is a projection system comprising one or more light sources configured to generate light output at an intensity determined by one or more light source control signals and one or more pixel screens having one or more pixel areas controllable to varying levels of translucency based on one or more pixel screen control signals. Also part of this system is a controller configured with one or more inputs configured to receive image data and a processor configured to process the image data to create the one or more light source control signals and the one or more pixel screen control signals. One or more outputs are configured output the one or more light source control signals to the one or more light sources and the one or more pixel screen control signals to the one or more pixel screens. Thus, on a frame by frame basis, the light output has an intensity or duration matching a maximum light intensity for a particular frame to thereby reduce power consumption.

In one embodiment, the one or more light sources comprise a red light source, a green light source and a blue light source. The one or more light sources may comprise one or more lasers. In one variation, the system further comprises one or more mirrors and lenses configured to focus the light to form an image. In addition, in one embodiment the pixels in the pixel screen which correspond to pixels in the image having the maximum light intensity for a frame are set to transparent to thereby allow all the light generated by the one or more light sources to pass through the corresponding pixels in the pixel screen. As is discussed herein the pixel screen may comprise fewer pixels that the image to be formed.

In yet another embodiment, a projection system controller for controlling projection of an image is disclosed. In this system a controller has an input configured to receive image data and a light source control signal output configured to output one or more might source control signals. A pixel matrix control signal output is configured to output one or more pixel matrix control signals and a processor is configured and provided to process the image data to generate and synchronize the one or more pixel matrix control signals with the one or more light source control signals to reduce power consumption of one or more light sources. This occurs by matching a light intensity output, light output duration or both from the one or more light sources to a light intensity for any one of the one or more brightest pixels in the image.

In one embodiment, the controller comprises a microprocessor configured to execute machine readable code. This system may also include a driver configured to receive the light source control signal output and generate a output signal to drive a light source. In one configuration, the pixel matrix control signal controls a level of transparency one or more pixels of an LCD screen between varying levels of transparency and opaqueness.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 8 is a table showing various exemplary desired power levels for power level mapping for Pulse_width, Power_target and Gain_set.

FIG. 9A illustrates an example embodiment of a scanning system with an LCD matrix which is a subset of the entire image pixel set.

FIG. 9B illustrates an example embodiment of a LCD matrix.

DETAILED DESCRIPTION

Figure 1A:
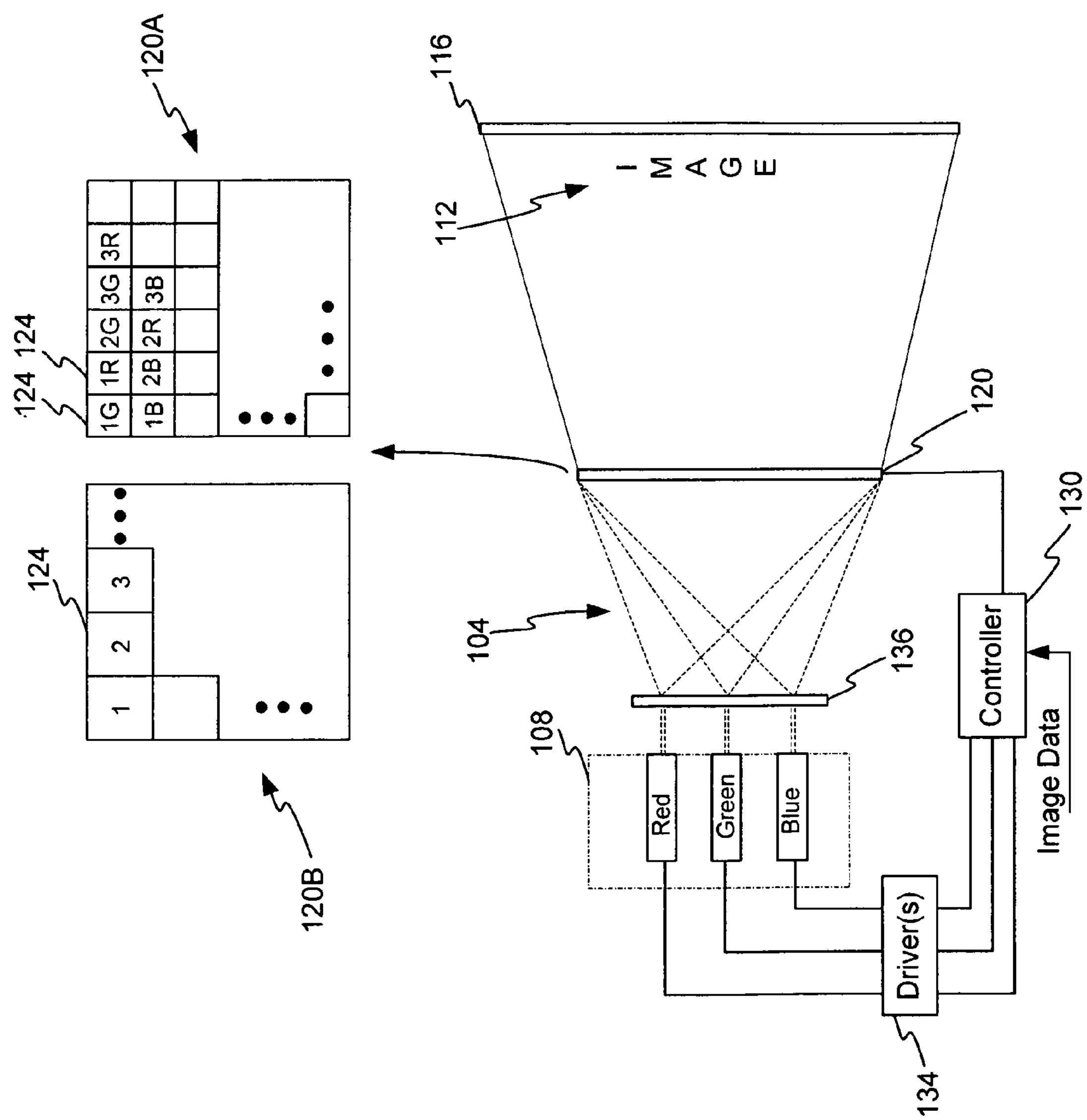
FIGS. 1A and 1B are a block diagram illustrating an example environment of use and the light source and pixel matrix controller.
Figure 1B:
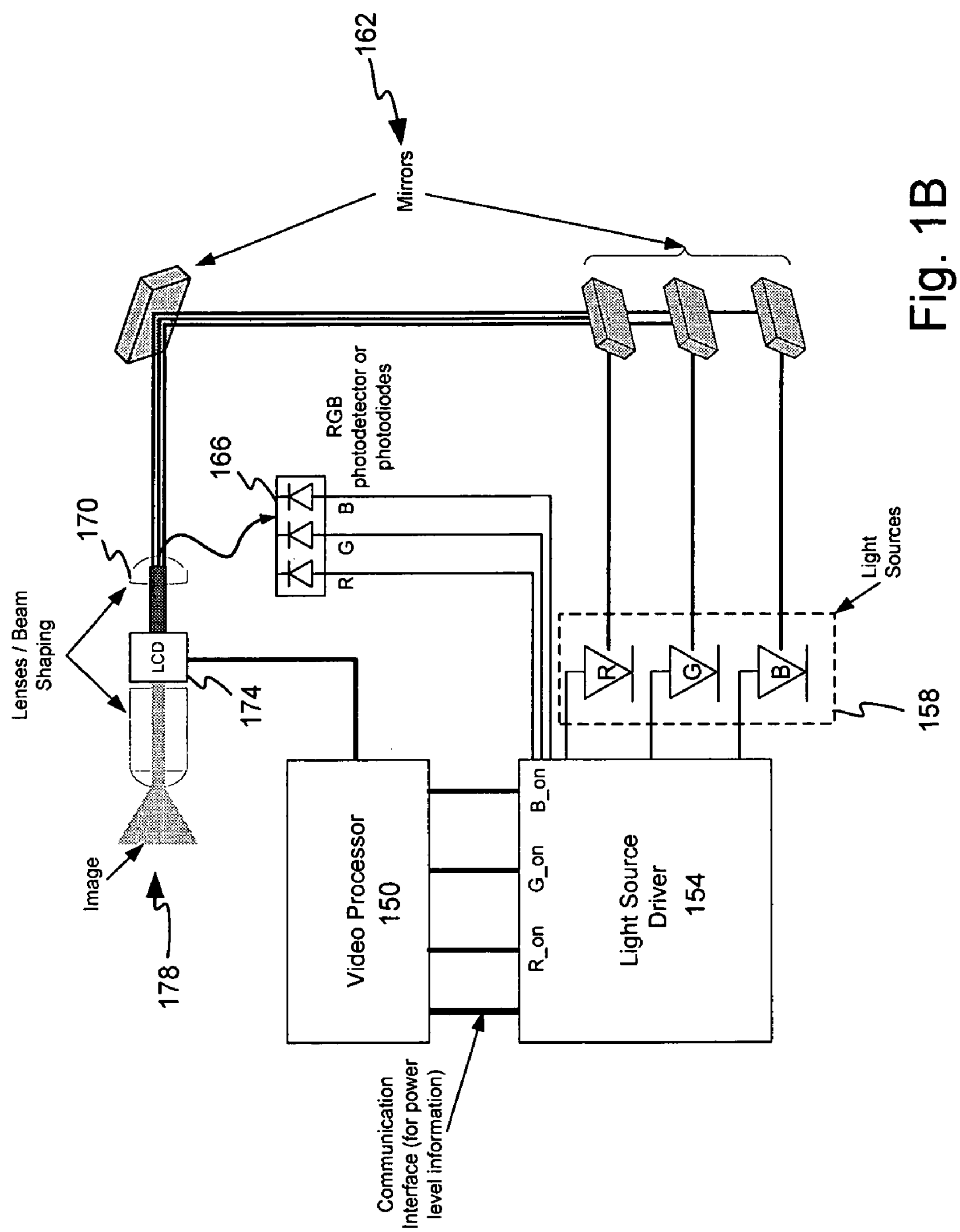

In an example environment shown in FIGS. 1A and 1B, a projector system is disclosed wherein light 104 is provided by 3 light sources 108, such as a red light source, green light source and blue light source. In other embodiments, different number of light sources may be utilized. The light sources 108 may comprise a laser, LED, or any other light source. The output of the light sources is provided to an optical system 136. In this embodiment, the optical system 136 comprises one or more lenses, mirrors, or both. The optical system 136 directs or focuses the light to a pixel matrix 120. The optical system 136 may be passive or active. The image 112 is created by shining on and filtering these colors through the pixel matrix 120. In one embodiment, the pixel matrix 120 is an LCD/LCoS system. In other embodiments it can be a DLP engine. The pixel matrix 120 is a matrix of pixels 124 where each one can be made transparent or opaque to light, or some level of opaqueness between transparent and opaque. The projected image 112 is created by shining through or blocking (selectively for each pixel) the light from the light sources 108. The resulting image 112 may be projected onto a viewing screen 116. Multiple pixel matrixes (LCD/LCOs screens) may also be used in some embodiments (for example one per color).

A controller 130 provides control signals or low power output to one or more drivers 134. The one or more drivers 134 amplify the signal(s) from the controller 130 to a level suitable to power the light sources 108. The controller 130 also connects to the pixel matrix 120 to provide one or more control signals to these devices. In this example embodiment, the controller 130 receives image data although in other embodiments it is contemplated that other type data may be sent to the controller. The one or more control signals are sent to the pixel matrix 120 to control the opaqueness of each pixel during different time periods and/or frames. The term opaqueness is defined to the mean the amount of light which is allowed to pass through a pixel 124 in the pixel matrix 120.

It is contemplated that the pixel may be clear, allowing 100% of the light to pass through (disregarding possible losses in the matrix itself), or opaque, allowing none (or very little) of the light to pass through, or any level of opaqueness there between to allow varying levels of light to pass through each pixel 124 of the pixel matrix 120.

The one or more control signals to the light sources 108 may control the intensity, duration, or other factor regarding the light emitted from the one or more light sources. It should be noted that in this example embodiment, the light sources are not on all at the same time and as such each of the 3 light sources is on for one third of the duration of a frame. The slow reaction time of the human eye is such that each frame is perceived in full color even thou the colors (light sources) are turned on in sequence.

Similar principles as described herein may be applied to a scanning system. The following discusses laser, or any light source, projection systems which scan the image and it is hereby incorporated by reference in its entirety herein: Application Publication Number 20080055557 entitled Method and Apparatus for Controllably Modulating a Laser in a Laser Projection Display. This publication discusses a scanning type projection system.

At the top of FIG. 1A are two example pixel matrixes 120A and 120B, either of which could be utilized. These pixel matrixes are in the light path between the light sources 108 and the screen 116. In the pixel matrix 120 shown at the top of FIG. 1A, the part 120 has been rotated 90 degrees to aid in understanding of the pixel screen. In this example embodiment intended for purposes of discussion, the pixels 124 in the pixel matrix which correspond to the first pixel on the viewable image 112 are labeled '1'. The pixels for the second pixel on the viewable image 112 are labeled '2'. As can be appreciated, in this embodiment, the pixel matrix 120A has three pixels 124 for each pixel in the viewable image. In this embodiment, each pixel 124 is assigned to a light source color, such as red, green and blue and is thus controlled during the time period when that light source is emitting light. At other times, it may be opaque, to hinder or prevent light from passing through.

In one embodiment, as shown in pixel matrix 120B, there is a one to one correspondence between the pixels on the pixel matrix 120 and the pixels of the image 112. Each pixel 124 is separately controlled for each period of the frame. For example, if the frame time is divided into 3 time windows, one window for each of Red, Green, Blue, then the opaqueness of each pixel 124 would likely be different during each of the three time windows depending on the intensity and color for that pixel for the frame. As such, the opaqueness of each pixel 124 is controlled during the frame to allow the desired amount of light of each color to pass. The eye will tend to blend this light to create the actual desired color. It is contemplated that other methods of selectively allowing light to pass through the pixel matrix 120 may be developed which does not depart from the claims.

FIG. 1B illustrates an alternative embodiment of the light source and pixel matrix controller. This is but one example possible environment of use. In this embodiment a video processor 150 generates, processes, or receives image data which is used to create an image. The video processor 150 outputs the image data to a light source driver 154 as shown. In this embodiment, the transfer occurs over a communication interface that includes power level information. The light source driver 154 also receives a feedback input from a photodetector 166, which is discussed below in more detail.

The light source driver 154 outputs drive signals to light sources 158 as shown. In this embodiment, there are three light sources tuned to red, green, and blue colors. In other embodiment, more or fewer light sources may be utilized. The lights sources 158 generate light output, which is directed to one or more mirrors 162 as shown, or directly to lenses or beam shaping apparatus.

The lenses or beam shapers 170 focus the light from the mirrors 162 through an LCD 174 or other light intensity control unit. Light passing through an LCD 174 may pass through additional lenses or beam shapers 170 before forming an image 178. Other embodiment may not include the mirrors, which are optional.

It is contemplated that the lenses or beam shapers 170 may direct a portion of the light to the photodetector 166. The photodetector 166 converts the light energy to a corresponding electrical signal to thereby provide a closed loop feedback to the light source driver 154 as shown or the video processor. It is contemplated that the embodiments of FIGS. 1A and 1B may be configured to process images or video.

Given the fact that the projector is portable it may be imperative to use any possible technique to improve power efficiency. This disclosure details a technique to significantly improve power efficiency of the light sources and/or system in general. The basic idea is to adjust the light intensity output of the light sources on a frame by frame instead of keeping the light source on at full intensity. This can be achieved by scaling the current of the light sources to correspond to the maximum required brightness of that color for a particular frame. Each light source color may be scaled or adjusted in this way.

Figure 2:
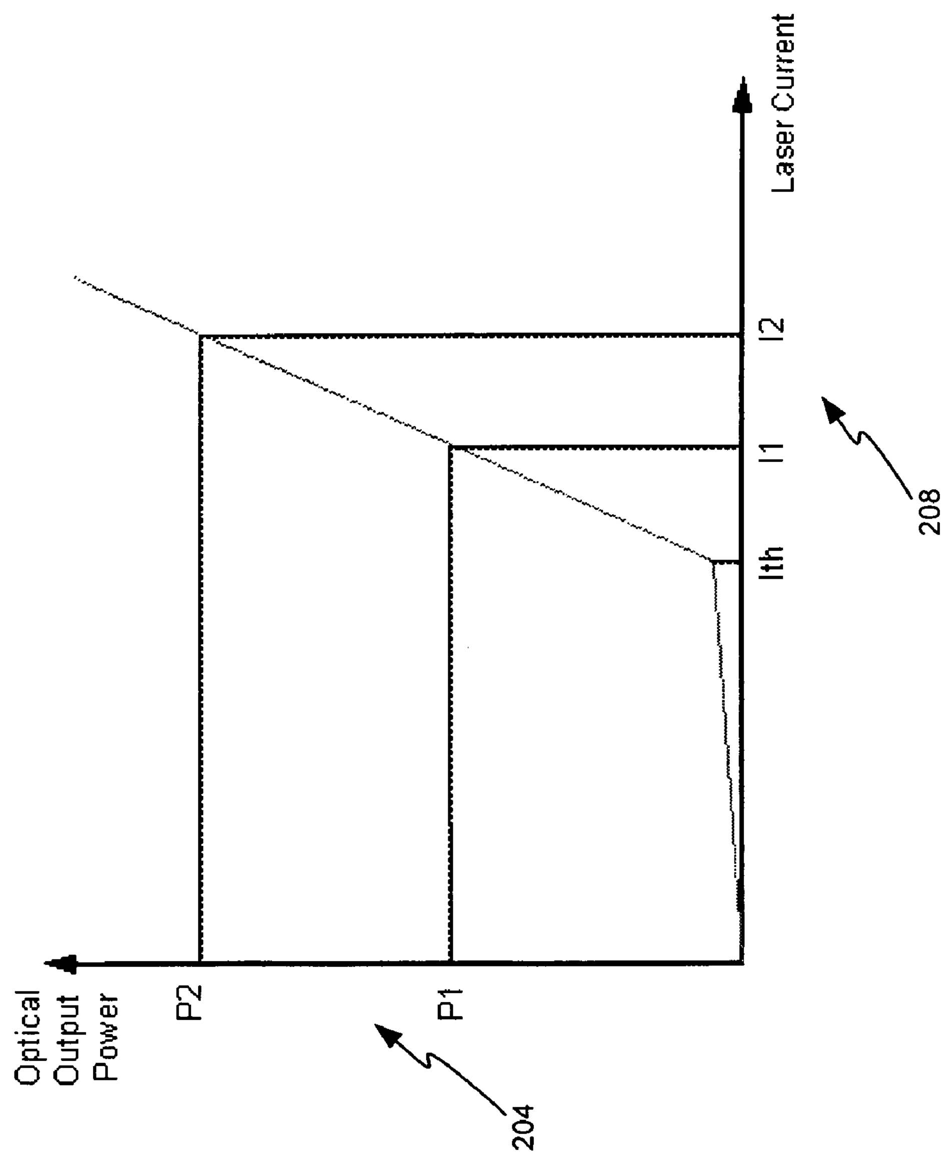
FIG. 2 is a plot of optic signal power in relation to light source current consumption.

As shown in FIG. 2 the optic power output is a function of input current. Optic power output is shown on the vertical axis 204 while current input to the light source is shown on the horizontal axis 208. By reducing the optical power output the power consumption of the light source will be reduced. Thus, one way to reduce power consumption is to reduce the light intensity of the light output from the light source. In addition, the light source voltage drop remains roughly constant for different input current. In this manner, by reducing the optic power output, the current consumption of the light source is reduced, and as such, power dissipation is also reduced. Thus, requiring reducing the light output intensity from level P2 to P1, allows the input currently to likewise be reduced from I2 to I1. This reduces power consumption.

Also, to the extent a light source may be turned entirely off during part of frame, additional power use reduction will occur since even during low power consumption mode, a light source like a semiconductor laser or LED has a turn on current, also called threshold current Ith. By shutting off the light source, power consumption due to the threshold current is avoided. Thus, the Ith can be eliminated. It should be noticed that in any light generation system (which might have a transfer characteristic different than the one shown in FIG. 2), the optical output power is always a function of input power with a conversion efficiency<1 (typically much smaller than 1). The invention will clearly apply to any light source moreover independently of the light source any optical power save will convert into a bigger electrical power saving.

To reduce power consumption, the intensity of the light from the light source, or its activation duration (pulse width), or both, is reduced. This in turn reduces power consumption as compared to prior art embodiments that set the light intensity at maximum for each frame.

When the intensity of the light source is adjusted, the level of transparency of each pixel of the pixel matrix 120 is also adjusted. For example if a pixel in the frame is at a certain intensity with the light sources at full power, the pixel transparency of the pixel matrix is scaled by the inverse ratio or some other inverse relationship of light intensity used to the full scale.

Figures 3A, 3B, 3C, 3D:
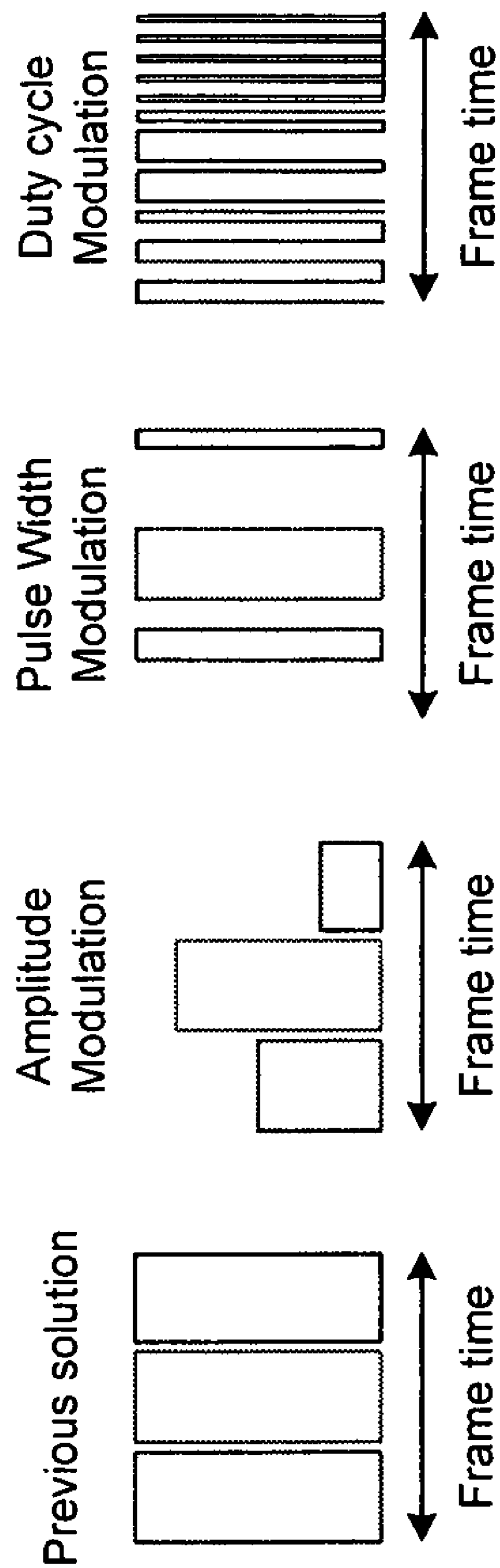
FIGS. 3A-3D illustrate plots of light output intensity and duration as created under a prior are method, amplitude modulation, and pulse width modulation and duty cycle modulation.

FIGS. 3A-3D illustrate example plots of the optic signal intensity or light intensity output. As discussed herein, during each frame, each color may only be on for a portion of the time. FIG. 3A illustrates a prior art system in which the light source is on for the entire period and the power saving mode having an amplitude modulation solution and a pulse width modulation solution. FIG. 3A illustrates an example prior art approach for light intensity presented to an LCD or other type screen. As can be seen in the two example plots, the light intensity is at full intensity for the entire duration of the frame, or each color's portion of the frame. This consumes power at a maximum rate.

The example plot of FIG. 3B illustrates an example of amplitude modulation of the light. In this example plot the light intensity is established only to a maximum intensity required for the screen array for a corresponding time period. Thus for each color, the intensity of the light output by the light source is set to the maximum intensity level for that color for that pixel. Thus, unlike the prior art, the light sources are not powered to their maximum level for every time period.

The example plot of FIG. 3C illustrates exemplary pulse width modulation of the light. In this example plot the light pulse duration is established only for a duration required for the LCD screen array for a corresponding time period, such a frame. Thus for each color, the duration of the light output by the light source is set to a duration that will establish the brightness of that particular color after passing through the screen array during a frame. Thus, unlike the prior art, the light sources are not powered for the entire frame color period.

In one embodiment such as that utilizing amplitude modulation of the light source as shown in FIG. 3B, the color intensity (luminosity) of each light source is at or above the color "intensity" of the pixel with the maximum color intensity within that frame. Given the finite response time of the eye (which effectively acts as low pass filter for the light) reduced color intensity can be obtained by reducing the light intensity or by leaving the light source on for less time than the frame duration and reducing the opaqueness of the corresponding pixel of the matrix screen.

In one embodiment, for each color, the frame of pixels is analyzed to determine the pixel with the greatest intensity (brightness) of that color and what that intensity level is in relation to the required light source output level. Then, the identified pixel is set to clear, i.e. no opaqueness, and the light source set to that light output power level. Consequently, the light source output level is set to the minimum possible light output level for that frame for that color. This in turn results in reduced current consumption and potentially, longer life span of the light source. This approach may have the added benefit of improved contrast ratio as well.

For each of the other pixels in the image frame, which have a lower light intensity than the previously identified pixel(s), the opaqueness of the pixel in the pixel matrix is increased to thereby reduce the light intensity through the pixel matrix, for that pixel in the image. For pixels which have none of the particular color component, the pixel in the pixel matrix is set to opaque to prevent any of that color from passing through the pixel matrix.

In addition and as discussed above, it is also contemplated that instead of the amplitude of the light source output being modified, in connection with the opaqueness of the pixels in the pixel matrix, the duration of the light pulse can be reduced. This is shown above in connection with FIG. 3C. This will also reduce power consumption because the light source, for each particular color, will be on for a shorter period of time. It is contemplated that as discussed above, the image pixel with the greatest color intensity for the particular color be identified and the duration of the light source on period be set to provide that level of light intensity. The corresponding pixel in the pixel matrix would be controlled to be clear, i.e. to let the full intensity of light to pass. For all other pixels in the image, the opaqueness of the pixels in the pixel matrix would be increase to correspond to the intensity of that color for that image pixel. This method has the additional advantage of saving the power corresponding to any threshold current for the amount of time that the light source (laser, LED, or any other source), is completely off.

FIG. 3D illustrates exemplary light output for a variation on pulse width modulation. In this example modulation technique, light source power consumption is reduced by adjusting the duty cycle of the pulses for each color. Although the pulses are established at full intensity, the duty cycle of the pulses are adjusted to match the maximum light intensity for the frame. This reduce power consumption by reducing the amount of time the light source is on and reduces threshold current consumption. A further advantage is that this modulation technique is insensitive to master clock variations. This modulation technique may also smooth or reduce artifacts in the produced image.

It is also contemplated that a combination of the 3 methods (amplitude modulation and pulse width modulation) in connection with pixel opaqueness control is also possible to achieve better resolution in the color intensity selection while realizing power savings.

Another approach is to utilize some form of closed-loop power control such that a photodetector or photodetector array provides feedback that is proportional to the power from the red, green and blue light sources. The signal can be digitized to provide information on the output power level and a controller can adjust the gain current settings for the light sources accordingly. Alternatively, the signal can be integrated over a period of time greater than a frame in order to provide feedback and control of the average power. However, because of the long integration or feedback time with either of these control methods, this approach will may not allow effective control of the output power on a frame-by-frame basis.

One advantage of this idea is power savings but other advantages are also present. In a typical movie or display image the average color intensity is in the order or 40%. Ideally therefore it should be possible to save up to 60% of the power dissipation in the light source if light source color "modulation" on a frame by frame basis by means of pulse width modulation or light intensity (amplitude) modulation is used. If amplitude modulation is used the theoretical power savings would be slightly reduced due to the finite threshold current of the light sources. In addition, light source life span may be increased if operated on a lower power and/or for a shorter amount of time. Likewise, cost saving may result if the projection system can be designed to operate with a lower average power.

To overcome the inconsistency of picture quality of time and/or temperature, the innovations disclosed herein includes an optic signal intensity feedback structure.

Figure 4:
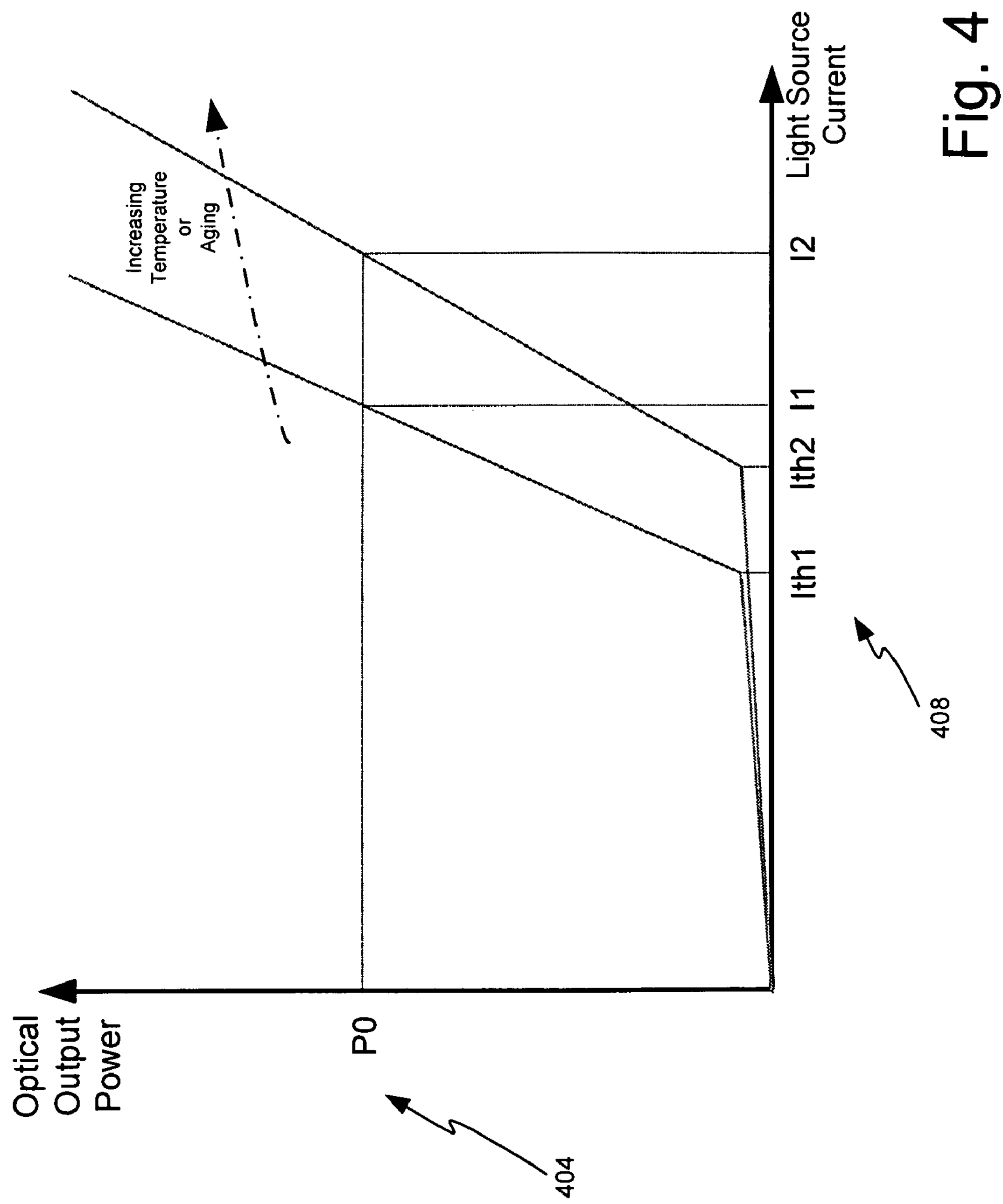
FIG. 4 are plots of light output power versus light source current in relation to increasing temperature or aging.

As way of introduction, the typical transfer curve of a light source optical output power as a function of current is represented in FIG. 4. In this example plot, optical output power is shown on the vertical axis 404 while the current of the light source is represented on the horizontal axis 408. This plot shows the affect of temperature or aging on device behavior. In this plot, as the temperature increases, the threshold current Ith of the light source increases and the conversion efficiency decreases (slope of the curve). A similar effect can be observed as the light source ages.

In projection systems one important component is the optical power output so in one embodiment, ideally, from a system standpoint, the video processor can communicate to the light source driver only the video information (i.e. the amount of color required for a frame) rather then the current required by the light source in the particular operating conditions (temperature and aging status). From FIG. 4 it is evident that the same optical output power might require significantly different currents.

One aspect of this innovation is use a monitor photodetector to monitor the amount of power (light intensity) emitted by the light sources and use the information to automatically adjust the current to the proper level.

The monitor photodetector(s) (PD) for one or more light sources may be placed in such a way that it gets illuminated by the light from one or more light sources. This can be achieved by means of back-facet monitor PD or optics and as such, one of ordinary skill in the art may enable such a system without undue experimentation.

It should be noted that the characteristics of the monitor PD do not change significantly across temperature or as a result of prolonged use (aging) and that the conversion efficiency from light to current remains constant and predictable across temperature, and as the system ages. Variations of PD conversion efficiency from part to part can be easily calibrated at a single temperature during the initial production testing.

Figure 5:
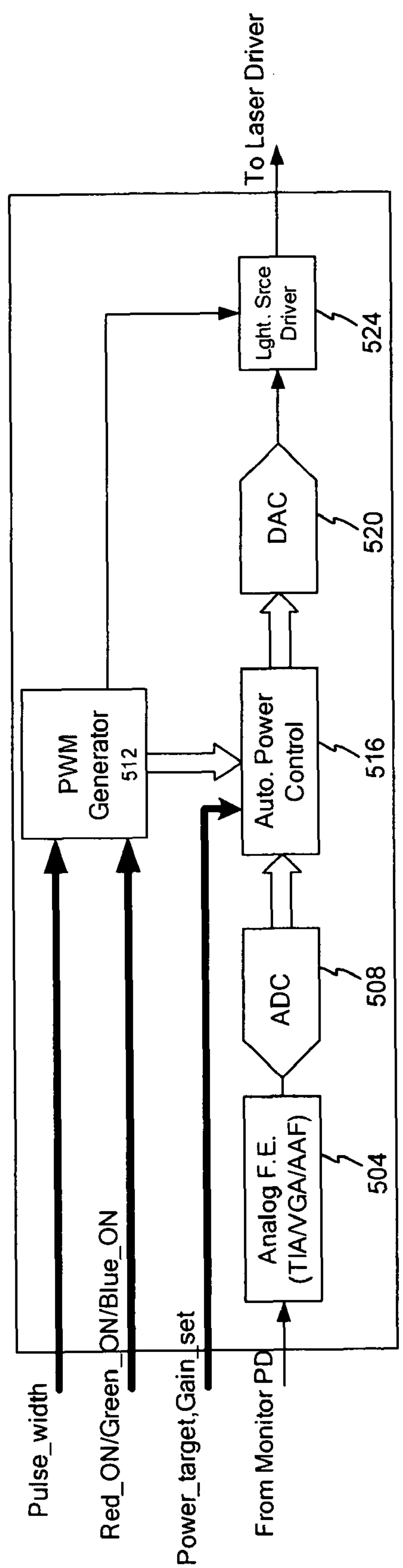
FIG. 5 is a block diagram of an example embodiment of a digital implementation of the innovation.

The block diagram in FIG. 5 represents a possible embodiment of the solution. A digital approach has been illustrated in FIG. 5.

As shown in FIG. 5, the analog front end 504 receives the current value from a monitor photodetector (not shown in FIG. 5). Before the analog front end (AFE) 504 (or as part of the AFE) may be a TIA (transimpedance amplifier), a VGA (variable gain amplifier, to properly scale the input) and an anti-aliasing filter (AAF). The output of the AFE 504 provides an analog signal to an ADC 508 where the data gets converted in the digital domain. An automatic power control loop (APC) including module 516 uses the information generated by a PWM generator 512 (relative to what light source is on during what time) to determine which samples from the ADC 508 need to be considered. The PWM generator 512 also receives a pulse width signal and a light color on signal, represented in this embodiment as Red_ON/Green_ON/Blue_ON. The APC module 516 receives a power target signal and a gain set signal as shown.

For example, the APC module 516 feedback may be frozen if the info from the PWM generator 512 indicates that the light source is off. The APC module 516 may comprise a digital integrator that compares the samples with the target value for that specific frame and adjusts, after proper scaling, the digital code for the DAC output which in turn converts the digital code into a current that feeds the light source driver. The output of the APC module 516 feeds into a digital to analog converter 520, the output of which connects to a light source driver 524. As is understood, the digital to analog converter converts the digital signal to an analog format. The light source driver 524 amplifies the signal to a power level suitable for driving a light source. The output of the light source driver 524 is output to, in this embodiment, a laser driver, although any light source may be utilized.

Figure 6:
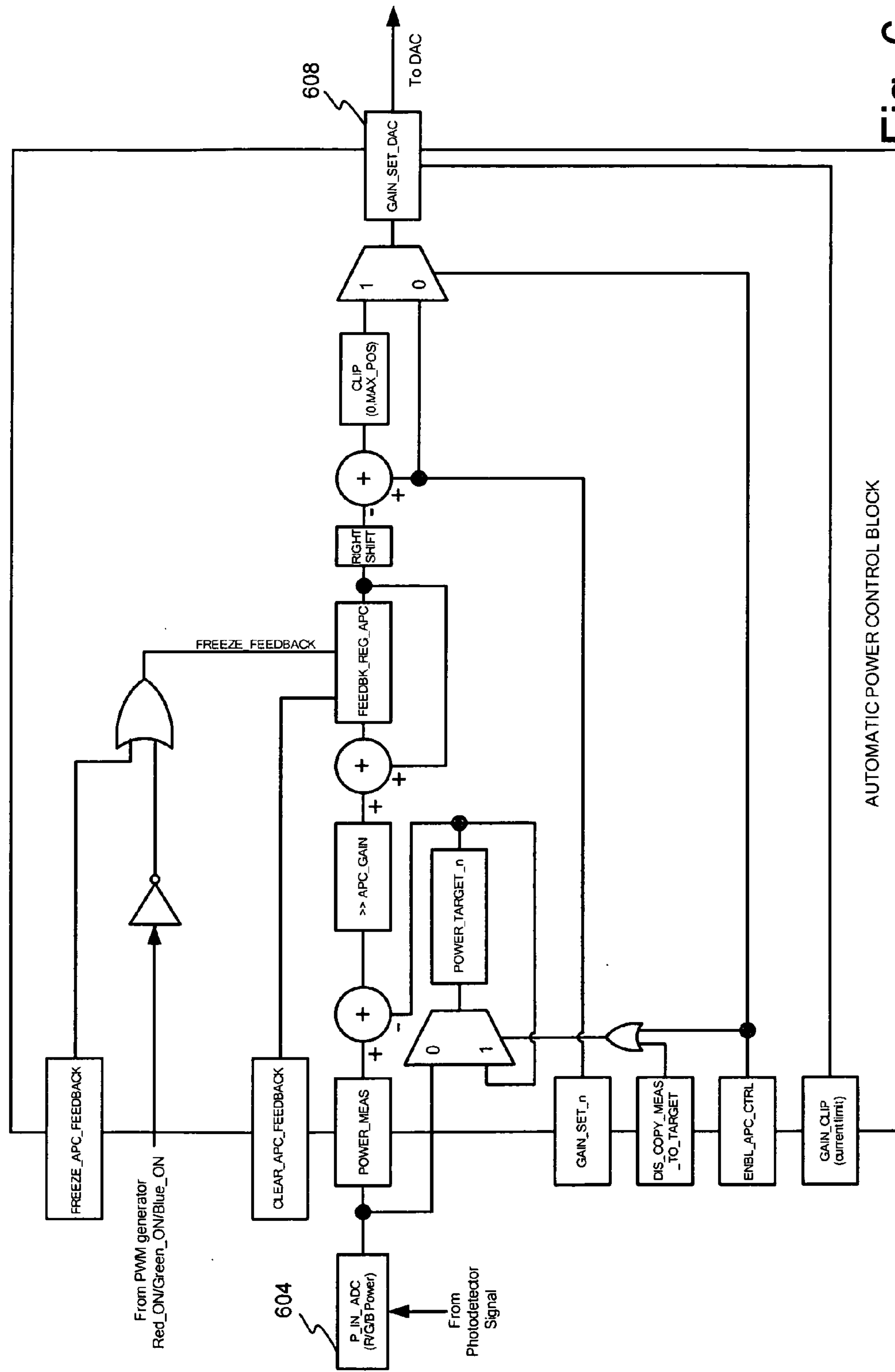
FIG. 6 shows a possible implementation of the power control loop.

FIG. 6 shows a possible implementation of the power control loop. This is but one possible example implementation and as such, the claims which follow are not limited to this particular embodiment. In this embodiment, the photodetector signal is input to the ADC 604 while the output is from the gain set DAC 608. One of ordinary skill in the art would understand this example implementation of the APC module (element 516 in FIG. 5) and as such this implementation is not discussed in detail.

Figure 7:
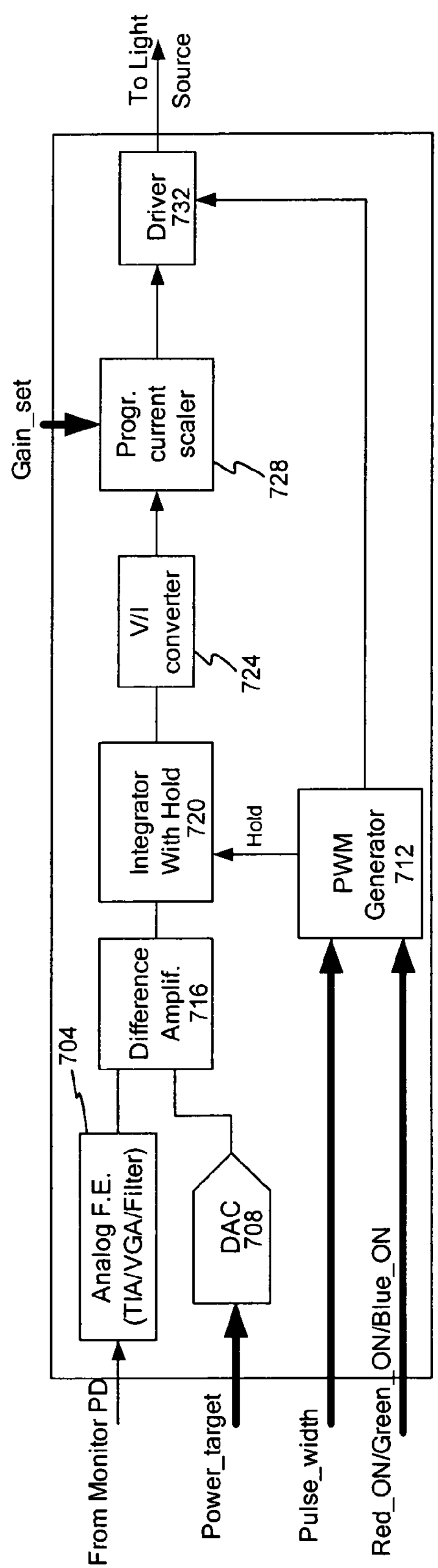
FIG. 7 is a block diagram of an example embodiment of analog implementation of the innovation.

FIG. 7 shows an analog implementation where the target value is converted into an analog signal and the comparison between the target and monitor PD signal is done by means of an analog comparator and an analog integrator. In this example embodiment, the feedback signal from the monitor photodetector feeds into an analog front end 704. A power target signal is input to a digital to analog converter (DAC) 708 while a pulse width signal and Red_ON/Green_ON/Blue_On signal are provided to a PWM generator 712. The output of the AFE 704 feeds into a differential amplifier 716, which also received the analog version of the power target from the DAC 708. The differential amplifier 716 outputs an amplified signal comprising the difference between its two inputs. The output of the differential amplifier 716 feeds into an integrator with a hold function. A hold signal is received from the PWM generator 712. The output of the integrator 720 connects to a voltage to current converter 724. The resulting current signal is output to a programmable current scalar 728, which receives a control input comprising a gain set signal as shown. The magnitude adjusted output of the current scalar 728 is input to a driver 732. The driver 732 generates and outputs a signal having a power level suitable for driving one or more light sources. The PWM generator 712 also provides an input to the driver 732 as shown.

In this embodiment the analog integrator is able to preferably retain the information from a frame to frame (hold function). In one embodiment, the hold time can be in the order of 0.1 kHz (100 frame per second refresh rate). Those of ordinary skill in the art can appreciate that this can be obtained by proper architectural choices and careful design. The front end is similar to the digital implementation as the current may be properly scaled. In one embodiment, the AAF is not necessary given that the signal will not be converted in the digital domain however some amount of filtering to reduce signal bandwidth and input referred noise can occur.

It should be noticed that in all the proposed implementations only one of the three channels (one for each color) are shown. The complete system may include three parallel channels or systems to multiplex some or all the blocks in the signal chain.

In this embodiment, for every desired power level a Pulse_width, Power_target and Gain_set may be associated as shown in FIG. 8. FIG. 8 illustrates a table of exemplary power level mapping. These parameters may be calibrated once at one single temperature during the production phase of the projector and the part will automatically correct for variation over temperature, and aging of the light source.

In both implementations the light source driver is configured to quickly (few tens of nsec in some embodiments) reduce to 0 the current delivered to the light source based on the information provided by the PWM controller. The fast response time results in sharp image generation and accurate brightness, particularly in time adjusted light output.

Returning to FIG. 7, The PWM controller can be implemented using a high speed clock (for example 10 MHz) and a programmable counter such that the pulse width of the ON signal for each of the light sources can be reduced by the amount of clock cycles specified by the counter. Assuming a 100 Hz refresh rate, the duration of a frame is 10 ms and with a 10 MHz clock (100 ns period) the resolution would be of 10 ppm (part per million). It is evident that in order to prevent modulation of the PWM and therefore of the light output the clock is preferably stable over temperature supply and parts. A multiplicity of inexpensive and very stable MHz range clock sources are readily available (for example 19.44 MHz crystal oscillators) and are very likely to be already present in the system.

Such an embodiment or environment is an example of where instead of modulating with a single pulse, multiple pulse modulation techniques would provide an advantage. An advantage would be realized because if the multiple pulses are generated using an unstable clock, the ratio between clock cycles when the power is on and when the power is off is constant so the optical power output will be accurate because the duty cycle will be accurate in spite of the variations of the clock. This assumes that the number of full cycle within a period is high enough so that if the last cycle is cut short by the termination of the frame it will not impact significantly the average duty cycle and therefore power.

Other implementations for the PWM generator could make use of a multiple stage delay locked loop. In such an embodiment, the loop can be locked to the periodic on signal for the light sources and the pulse width modulation can be achieved by selecting different taps of the multiple stage DLL as the on signal actually delivered to the light source driver.

It is also contemplated that the Red_On, Green_On, and Blue_On signal could be used to PWM the signal externally. Thus, in one embodiment, normal Red_On, Green_Om, Blue_On signal having a ⅓ on time are provided to the system, and then the controller programs amount of time for the light source to be on through the PWM generator block. As such, the system would internally generate pulse widths according to color light intensity (power) for the frame. Or the Red_On, Green_On, Blue_On signals provided to the system could be varied in length so that the external video data could be used control the PW. Thus, PWM could be implemented with Red_On, Green_On, Blue_On signals to enable target power level. PWM could be performed in the block as shown or the Red_On, Green_On, Blue_On signals provided to the system can be varied in duration.

In addition, it is also contemplated that the LCD matrix or other pixel mask may comprise a matrix block which is a subset of the entire number of pixels in the image. The LCD matrix, or other light intensity control filter, may comprise any shape or array, such that over time and through use of a scanning mirror, light passing through this LCD matrix forms the image. FIG. 9 illustrates on such embodiment. The system and method of FIG. 9 is similar to the system of FIG. 1. As such, only the aspects of FIG. 9 that differ from the system of FIG. 1 are discussed.

In contrast to FIG. 1, the LCD matrix 900 of FIG. 9 comprises a subset of the entire number of pixels in the image 116. In this example embodiment, the LCD matrix 900 is configured to correspond to a row of the image. The number of LCD matrix pixels may be any number, but in this embodiment is the same number as the number of pixels in a horizontal row. In other embodiments, the LCD matrix 900 may comprise any shape, such as a vertical column, a portion of a row or column, a block, or any other shape or design. It is also contemplated that light filters other than a LCD matrix may be adopted for use. As discussed above, the controller 130 controls which pixels in the LCD matrix 900 are clear, opaque, and which have varying levels transparency. FIG. 9B illustrates an example embodiment of a N-pixel LCD matrix, where N is the number of pixels in a row.

Aligned with the LCD matrix 900 is a scanning mirror 904 which is also position controlled by an output from the controller 130. The scanning mirror 904 is controlled to reflect and scan the light output from the LCD matrix 900 to and across the screen 116. The scanning mirror 904 may comprise any type scanning reflector capable of being controlled to selectively, based on control timing, scan the light output from the LCD matrix 900 to the screen 116.

In operation, the light sources 108 generate light output which is focused on the LCD matrix 900. In one embodiment, each of the three light sources is on for ⅓ of the time the LCD matrix is scanned on one place of the image. To reduce power consumption, the light sources may be powered at a level below maximum intensity or may only be on for a limited period of the usual ⅓ frame duration. For example, the light source hits the LCD matrix 900 and the LCD matrix selectively, on a pixel by pixel basis, but at an entire row at a time, filters the light to reduce the intensity of the light passing to the scanning mirror 904 and eventually to the screen 116.

As described above, for the particular pixel line of the image that is to be generated, the pixels in that line are evaluated to determine the pixel with the highest intensity (overall or based on color). Then the LCD matrix 900 is controlled to set that corresponding pixel in the LCD matrix to be transparent and pass all generated light to the scanning mirror 904. Light intensity for the row is also set to this maximum level such that for the one or more pixels in the row that are transparent the light source is set to an intensity that generates an image with the desired brightness for those one or more pixels. Pixels on the screen which are to be black (if any) will have a corresponding LCD matrix pixel which is completely opaque, thereby preventing any light from passing through the LCD matrix. For other pixels in the LCD matrix 900, the translucency level of pixels in the LCD matrix are controlled to adjust the light intensity which passes through the LCD matrix to the scanning mirror 904, but based on the light intensity for the one or more brightest pixels. For screen pixels which are to be darker, the corresponding pixel in the LCD matrix is made less transparent to thereby darken the corresponding screen pixel. Likewise, for screen pixels which are to be brighter, the corresponding pixel in the LCD matrix is made more transparent to thereby brighten the corresponding screen pixel. It is also contemplated that the matrix screen may also be controlled to correspond to the color of light hitting the matrix such that for a image, the various color combine during a frame to form the color image. The innovation disclosed herein may also be used in a black and white or gray scale projection system.

In the embodiment where the LCD matrix corresponds to a row of pixels in the image and is scanned via the scanning mirror 904 on a row by row basis, the timing may be as follows. For a system with three light sources, each light source would be on for ⅓ of the row scanning period. During a frame, the scanning mirror would scan the entire image. Thus, for each row, an individual light source from the group of light sources 108 would be on for a period equal to ⅓ divided by the number of rows in the image. Alternatively each of the light sources might be on for the duration of ⅓ of the frame while the scanning mirror constructs the image for that particular color scanning each row of the image, before moving on to the next color. It is contemplated that the intensity of the laser light can be varied for each row even though the laser is on for the duration of ⅓ of the frame. Laser power control can be achieved either by amplitude modulation, PWM or any combination of these methods.

After the light passes through the LCD matrix 900 and is selectively attenuated, if at all, on a pixel by pixel basis, one row at a time, it strikes the scanning mirror 904. The scanning mirror 904, on a row by row basis, and in synchronization with the light source and the LCD matrix 900 scans the light from the LCD matrix across the screen 116 to create the image. To achieve synchronization and proper scanning, the controller 130 provides control or command signals to the scanning mirror 904 or a mirror controller (which for this discussion is considered to be part of the scanning mirror) and the light sources. The scanning occurs on a LCD matrix block 900 by LCD matrix block basis to create the image on the screen 116. During one frame of image data, the scanning mirror 904 scans the output from the LCD matrix 900 across the screen 116 to create the image.

As a benefit to this embodiment, the LCD matrix 900 (or technology other than LCD) is made smaller, which may reduce the size, expense, or provide additional benefits for the projection system. In addition, power savings may be realized using this embodiment. Power saving occurs because the intensity output by the light sources, which may be varied by amplitude modulation, pulse width modulation, or both, is set by the brightest pixel in the LCD matrix 900, which is a subset of the entire pixel matrix that makes up the screen image. Thus for a screen image that has the bottom half bright and the top half dark, when scanning through the top half (dark half), the light intensity generated by the light source 108 may be set to low (or off). Then when scanning the bottom half of the screen (bright half), the light intensity of the light source 108 is increased. Power savings is realized because of the reduced light intensity, and corresponding power consumption, when scanning the top half of the screen image. Thus, for this example image, the light source could be off, and consuming no current, for half of the frame. In contrast, if the LCD matrix 900 was the same size as the image matrix, then the light sources 108 would output a high intensity for the entire frame and the LCD matrix 900 would force the pixels in the top half of the LCD matrix to be opaque. It should also be noticed that the same power saving advantages could be achieved even with a full frame/image LCD matrix. A full image LCD can always be used as a smaller panel LCD. By way of example and not limitation, if the image could be broken into 2 pieces, in this case however the full image LCD would have to be 2 times faster. While obviously this embodiment does not provide any area benefit, the power benefit from a light sources standpoint would be the same as a matrix LCD of the same size as the sub-image used (½ the image in the example). It is also contemplated that in other embodiments the LCD could be separated into any number of pieces.

It is also contemplated that the embodiments disclosed herein may be implemented using a control loop timing that is achievable using current technology. In one embodiment, the duration of a scan line is 5 microseconds, and existing light source drivers are capable of this response rate. Regardless of the type of light source control, either pulse width/duty cycle modulation, amplitude modulation, or a combination of both, or some other type of light source intensity control, such control and control rates are achievable.

Other systems, methods, features and advantages of the invention will be or will become apparent to one with skill in the art upon examination of the figures and this detailed description. It is intended that all such additional systems, methods, features and advantages be included within this description, be within the scope of the invention, and be protected by the accompanying claims. While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for generating a projected image comprising multiple image pixels, wherein for each color the method comprises:

processing a pulse width signal and a light source select signal to generate modulation control data;

receiving and processing image data to create pixel matrix control data and light source control data, the light source control data generated by processing a feedback signal, a power control signal and the modulation control signal;

providing the light source control data to one or more light sources to selectively control output intensity of the light source on a frame by frame basis;

providing the pixel matrix control data to one or more pixel matrixes to selectively control the opaqueness of the pixels of the one or more pixel matrix on a frame by frame basis;

wherein for a particular frame, the output intensity of one of the one or more light sources is set at a level by means of the modulation control signal which will yield a desired color intensity for the image pixel with the highest color intensity and a corresponding pixel in the pixel matrix is controlled to pass therethrough generally all of the light from the light source.

2. The method of claim 1, wherein the pixel matrix comprise a LCD/LCoS/DLP screen or other mean of filtering the light on a pixel by pixel basis.

3. The method of claim 1, wherein the pixel matrix comprises fewer pixels than comprise the image.

4. The method of claim 1, wherein the receiving and processing image data is performed by a controller.

5. The method of claim 1, wherein at least one pixel in the pixel matrix is controlled to be transparent.

6. The method of claim 1, further comprising outputting light energy from the one or more light sources to generate an image.

7. A method for controlling one or more light sources and one or more pixel screens to generate an image frame comprising:

receiving image data, the image data representing an image to be projected, wherein within the image frame, one or more pixels have a highest light intensity for the image frame;

for the image frame, processing the image data to determine which one or more pixels in the image frame have the highest light intensity;

generating one or more pixel screen control signals to set translucency levels for the one or more pixels in the pixel screen, wherein one or more pixels having the greatest light intensity are set to translucent;

determining an optic signal power level required to generate the highest light intensity for the image frame;

generating one or more light source control signals based on the optic signal power level required to generate the highest light intensity by:

processing a pulse width control signal and a light source select signal with a pulse width modulation generator to generate a modulation control signal;

processing a photodetector feedback signal, a power target signal and a gain set signal with an automatic power control module to generate a driver input;

processing the modulation control signal and the driver input to generate the one or more light source control signals;

outputting the one or more pixel screen control signals to the pixel screen;

outputting the one or more light source control signals to the one or more light sources.

8. The method of claim 7, wherein the one or more light sources comprise one or more lasers.

9. The method of claim 7, wherein the one or more pixel screens comprise one or more LCD screens having individually controllable pixel areas capable of being controlled between a generally transparent state to a generally opaque state.

10. The method of claim 7, wherein the one or more pixel screen control signals control pixels the pixel screen corresponding to pixels in the image frame having less than the highest light intensity to a corresponding level of translucency to pass an appropriate amount of light.

11. The method of claim 7, wherein the one or more light sources output light having an intensity corresponding to the maximum light intensity for the image frame.

12. The method of claim 7, wherein the one or more light source control signals control the intensity of light generated by the one or more light sources.

13. A projection system comprising:

one or more light sources configured to generate light output at an intensity determined by one or more light source control signals;

one or more pixel screens having one or more pixel areas controllable to varying levels of translucency based on one or more pixel screen control signals;

a controller configured with:

one or more inputs configured to receive image data;

a processing system configured to process the image data to create the one or more light source control signals and the one or more pixel screen control signals, the processing system comprising:

a differential amplifier configured to receive and process a photodetector feedback signal and a power target signal to generate a difference signal;

a modulation generator configured to receive and process a pulse width signal and a light source select signal to generate a hold signal and a modulation control signal;

an integrator configured to receive the difference signal and the hold signal to generate an integrated signal;

a scaler configured to adjust the magnitude of the integrated signal base on a gain set signal to generate a control signal;

a driver configure to receive and processes the control signal and the modulation control signal to generate the one or more light source control signals;

one or more outputs configured output the one or more light source control signals to the one or more light sources and the one or more pixel screen control signals to the one or more pixel screens such that on a frame by frame basis, the light output has an intensity or duration matching a maximum light intensity for a particular frame to thereby reduce power consumption.

14. The system of claim 13, wherein the one or more light sources comprise a red light source, a green light source and a blue light source.

15. The system of claim 13, wherein the one or more light sources comprise one or more lasers.

16. The system of claim 13, further comprising one or more minors and lenses configured to focus the light to form an image.

17. The system of claim 13, wherein the pixels in the pixel screen which correspond to pixels in the image having the maximum light intensity for a frame are set to transparent to thereby allow all the light generated by the one or more light sources to pass through the corresponding pixels in the pixel screen.

18. The system of claim 13, wherein the pixel screen comprises fewer pixels that the image to be formed.

19. A projection system controller for controlling projection of an image, the image comprising two or more pixels the system comprising:

A controller having:

an input configured to receive image data;

a light source control signal output configured to output one or more light source control signals;

a pixel matrix control signal output configured to output one or more pixel matrix control signals;

a processing system configured to process the image data to generate and synchronize the one or more pixel matrix control signals based on one or more light source control signals that reduce power consumption of one or more light sources by matching a light intensity output, light output duration or both from the one or more light sources to a light intensity for any one of the one or more brightest pixels in the image, the processing system comprising:

a pulse width modulation generator configured to receive and process a pulse width control signal and a light source select signal to generate a pulse width control signal;

an automatic power control module configured to receive and process a feedback signal, a power target signal and an input from the pulse width modulation generator to generator a light source power control signal; and a light source driver configured to receive the pulse width control signal and the light source power control signal to generate the light source control signal.

20. The controller of claim 19, wherein the controller comprises a microprocessor configured to execute machine readable code.

21. The controller of claim 19, further comprising a driver configured to receive the light source control signal output and generate an output signal to drive a light source.

22. The controller of claim 19, wherein the pixel matrix control signal controls a level of transparency one or more pixels of an LCD screen between varying levels of transparency and opaqueness.

* * * * *